Dec. 31, 1963  K. W. MAIER  3,116,056
FRICTION BRAKE
Filed Aug. 5, 1960  3 Sheets-Sheet 1

INVENTOR.
BY Karl W. Maier.

Dec. 31, 1963   K. W. MAIER   3,116,056
FRICTION BRAKE

Filed Aug. 5, 1960   3 Sheets-Sheet 2

INVENTOR.

BY   Karl W. Maier

United States Patent Office 3,116,056
Patented Dec. 31, 1963

3,116,056
FRICTION BRAKE
Karl W. Maier, 7 Cranberry Lane, Cheshire, Conn.
Filed Aug. 5, 1960, Ser. No. 47,650
4 Claims. (Cl. 267—1)

When an elastic mechanical system is acted upon by impacts or other varying exterior forces, sudden displacements or oscillations about the neutral position will result. If the amplitudes of motion are considerable, it becomes necessary to control these displacements by means of a damping unit which continuously withdraws kinetic energy from the system. This absorption of mechanical energy can be accomplished by conversion into heat, either by the friction between solid surfaces (Coulomb friction brakes) or by the inner friction in fluids (hydraulic brakes). The friction snubbers and hydraulic shock absorbers in the suspension systems of automobiles and railroad cars, the recoil brakes of guns, etc., are such examples. Such brakes generate forces opposite to the direction of motion and do not have a recuperating tendency of their own. Rather, it is the dominance of the elastic forces over these opposing brake forces which guarantees the return of the system to its neutral or equilibrium position.

With hydraulic brakes, the brake force developed is a function of the velocity of motion. The components require manufacture to close tolerances and are therefore costly. Continuous maintenance is required due to the imminent danger of fluid leakage. With these disadvantages, hydraulic brakes are only feasible in larger sizes.

With Coulomb friction brakes, the brake force is generated by the friction between two solid surfaces being relatively displaced under contact pressure. A metal surface may slide relatively to the surface of another metal or of a resin type brake lining, either in the dry or in the lubricated state. The brake force thus developed is independent of the displacement. Such friction brakes do not require special maintenance and are also feasible in smaller dimensions. However, there are other serious shortcomings. The brake force is usually sensitive to changes in the friction conditions which are beyond control. Resin type brake linings improve this situation, but add complexity to the design. Furthermore, these brakes often contain a considerable number of components and have also considerable length.

Therefore, there is a definite need for a friction brake, which does not have the disadvantages stated above. The invention in question is based on the following objective: To create a friction brake of simple design, short length and low manufacturing cost by utilizing the Coulomb friction, preferably between two metallic surfaces in the unlubricated state, to generate a brake force which is rather independent from the uncontrollable changes of the friction coefficient $\mu$ encountered in practice. In other words, a simple friction brake with "$\mu$-insensitive" brake force is wanted.

The invention is characterized by a cylindrical housing containing a brake assembly, which exerts radial contact forces on the housing. The brake assembly consists of an axial force generating means or actuator spring, and a both axially flexible and radially expandable force transmitting friction unit. The axial force exerted by the preloaded actuator spring on the friction unit tends to expand the friction unit in the radial direction and, due to the confinement in the housing, brings about radial contact forces between the friction unit and the housing. When the housing is moved by exterior forces, the friction unit, and thereby the entire brake assembly will participate in this motion due to the coupling effect of said radial contact forces. However, as soon as the brake assembly reaches a stationary stop in its path, these radial contact forces will generate axial friction forces during the continued movement of the housing. The brake force developed is evidently independent of the displacement of the housing, but depends on the direction of motion.

Therefore, we have the following basic arrangement of friction brake:

First, a stationary member containing axially extended guide tracks for the movable housing and brake assembly and having stops in the path of the brake assembly.

Second, a cylindrical housing consisting of an outer tube or inner rod axially displaceable with respect to said stationary member.

Third, a brake assembly received in the housing and being axially displaceable between stops on said stationary member, said brake assembly comprising an axial force generating means or actuator spring and a both axially and radially flexible, force transmitting friction unit which converts said axial forces into radial contact forces on the confining housing. Between each pair of opposing ends of the force generating means and the friction unit, a separating member or end support is installed, with all four (4) members forming a closed circuit in axial force transmission. For example, an actuator compression spring may be arranged in axial series with a separator member and the friction unit between two flanges of an axially extended brake retainer.

The major and most novel unit is the force transmitting friction unit. The latter consists of an axially displaceable as well as axially flexible brake seat acted upon by the actuator spring via separator and retainer flange, and a brake shoe displaceable in both the axial and radial direction, said brake seat by means of axially inclined camming surfaces acting on the brake shoe to force the latter into contact with the axially extended surface of a friction force generating outer housing or inner rod of preferably cylindrical shape. In practice, the brake seat and the brake shoe may have the form of a coil spring or may consist, as disclosed in my U.S. Patent No. 2,948,-529, of sections thereof. Here the coils of the same spring are prevented from closing, but the coils of the two nested springs contact each other alternately.

When the housing is at rest, the axial force $P_0$ of the preloaded actuator spring is transmitted through the separator and the friction unit to exert an equal axial force on the opposite flange of the brake retainer, while the brake shoe of the friction unit exerts radial forces on the confining housing.

When the housing moves with respect to the brake assembly which has been arrested at one of the stationary stops, said radial contact forces generate a brake force B on the brake shoe of the friction unit in the direction of motion of the housing. For equilibrium reasons, the axial brake force $P_n$ transmitted at the retainer flange adjacent to the friction unit is now different from $P_0$. With a given brake configuration under given friction conditions, the axial end forces acting on the friction unit are always in a constant proportion $C>1$. Therefore, the friction unit acts as a force multiplier, with C denoting the "force multiplication factor." In design, C can be varied over a wide range by selection of the angle ($\alpha$) of the camming surface to the longitudinal axis and also by the number ($n$) of brake shoe coils. C is further influenced by the coefficient of friction ($\mu$) on the friction force generating surfaces.

Of course, the direction of force multiplication depends on the direction of motion of the housing. The preload $P_0$ of the actuator spring acting on one end of the friction unit via the separator is the original and determining force. When the housing moves in the direction of this force $P_0$, the brake force B exerted by the housing on the friction unit will have the same direction and, for equilibrium reasons, the force $P_n$ transmitted at the retainer flange on the other end of the friction unit is then greater than $P_0$:

$$P_n = C \cdot P_0; \qquad B = (C-1) \cdot P_0$$

Here the brake force B is transmitted from the friction unit directly to the stationary stop bypassing the actuator spring. This case may be designated as the case of "uni-directional spring and brake forces," or "high brake force."

When the housing now reverses its motion, the friction force B' exerted by the housing on the friction unit will be in opposite direction to the axial end force $P_0$, transmitted through the separator, resulting in an axial end force $P_n'$ at the retainer flange smaller than $P_0$:

$$C \cdot P_n' = P_0; \qquad B' = (1 - 1/C) \cdot P_0$$

Here the brake force B' is transmitted from the friction unit to the corresponding stop in an indirect manner; i.e., through the actuator spring. This case may be designated as the case of "opposing spring and brake forces" or "low brake force," since B' is always less than B.

It may be noted from the above equation that the brake force B' can never exceed the preload $P_0$ of the actuator spring. This is due to the fact that the friction unit requires axial forces at both ends in order to maintain radial contact forces on the housing. It is further evident from the above equation that the brake force B' will approach the preload $P_0$ as the force multiplication factor C is increased by increasing the number (n) of brake shoe coils. Such a brake configuration generating a limited brake force slightly less than the preload of the actuator spring has another important effect: Even with great changes in the friction conditions as expressed by the friction coefficient ($\mu$), the brake force will change only slightly. Therefore, in the case of opposing spring and brake forces, such a friction brake acts as a "$\mu$-insensitive" brake developing a practically constant brake force regardless of the uncontrollable changes in the friction conditions. This feature is to be rated as a major design advantage of the invention.

In the design and arrangement of this new type friction brake, many modifications are possible.

The stationary member may take the form of an inner rod or outer tube for direct guidance of the brake retainer, with radial steps serving as stops for the brake assembly.

The basic arrangement of the friction brake is a movable outer housing in frictional contact with the outer spring of the friction unit. This arrangement can easily be reversed as follows: A movable inner rod representing the housing is in frictional contact with the inner spring, now serving as the brake shoe of the friction unit, while the brake retainer and the outer spring, now representing the brake seat, surround the brake shoe.

Furthermore, it is also possible to have the friction unit in frictional contact with both an outer tube and an inner rod. Here the brake retainer may be received and guided in a longitudinal groove of the inner rod. This arrangement, though mechanically more complex, gives utmost utilization of space.

Although the inner surface of the housing is usually of cylindrical shape, with an inside diameter confining the expansion of the friction unit, it may in addition contain a tapered section and adjacent cylindrical section of a larger inner diameter beyond the radial expansion capability of the friction unit. When entering the large diameter section of the housing, the friction unit loses its grip with the housing. This possibility may be utilized in such cases of design where a release of the brake force is desired for a certain travel range of the housing.

An especially simple friction unit is obtained by making the actuator spring and the brake seat from one piece, eliminating the separator.

It was mentioned above that the basic arrangement of this friction brake gives different brake forces in opposite directions. The brake force B, in the case of unidirectional spring and brake forces, is greater than force B' in the case of opposing spring and brake forces, and is also sensitive to changes of the friction coefficient ($\mu$). In many cases of design it is highly desirable to have the same low and $\mu$-insensitive brake force B' in both directions. It speaks for the versatility of this brake configuration that this can be accomplished by arresting the first end support or the separator on one of the stationary stops and the second end support or brake retainer on the other of said stationary stops.

In the usual arrangement, the actuator spring is arranged in line with the friction unit. If longitudinal space is at a premium, the actuator spring can also be arranged concentrically within the friction unit by proper modification of the brake retainer and the separator. This results in a very compact design of brake assembly and also provides a very large friction surface.

The force generating means of the friction unit can take many different forms such as an air spring, a compressible fluid, etc., with a compression coil spring being a frequent choice. However, an extension coil spring may also be used to advantage, especially when arranged concentrically inside the friction unit. The first and second end supports then take the form of rather simple and even identical parts, and any combination of low and high brake forces can be selected at will for the two directions of motion by proper positioning of the stops.

Still another modification is the double use of the inner spring as a brake seat and an actuator spring in one, eliminating also the need for a separator and brake retainer. This can be accomplished in simple form by using an extension coil spring with originally closed coils in an extended position for the inner spring. The brake seat coils then have a tendency of their own to close, thus forcing the brake shoe into frictional contact with the housing. There is a great variety in the design of the ends of the brake seat engaging the stops. These configurations very easily can be made to develop the same low and $\mu$-insensitive brake force B' in both directions.

The brake retainer's main function is to keep the axial series arrangement of actuator spring and brake seat in a preloaded state. However, with small radial clearance to the brake seat, the brake retainer may also serve as an inner support for the brake seat to permit the transmission of higher forces.

The brake seat and brake shoe may be coiled from round wire or bar stock and then ground along one of the contact surfaces. However, it is even simpler and cheaper to manufacture these elements of the friction unit from profile wire or profile bar stock of essentially triangular cross-section.

While the brake seat is a continuous helical spring, the brake shoe helix may be divided into sections of various arc lengths to facilitate expansion and contact with the housing.

The invention will now be further described and explained in connection with the following drawings in which.

Figure 9:
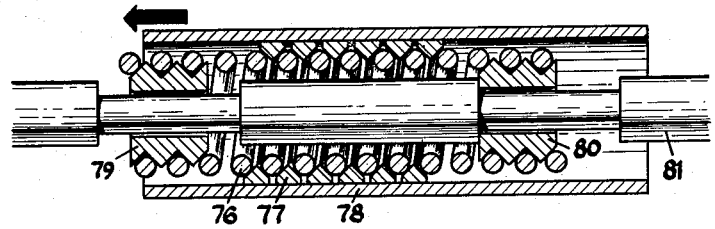
Figure 10:
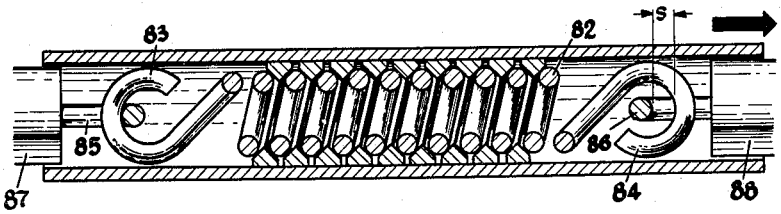

FIG. 9 is a longitudinal section of a friction brake where the actuator spring is held in extension between two identical retainers so as to also serve as the inner or brake seat spring of the friction unit; and FIG. 10 is a longitudinal section of a friction brake similar to the one shown in FIG. 9 but where the ends of the actuator spring are shaped as hooks which engage hooks on the stationary member.

Figure 1:
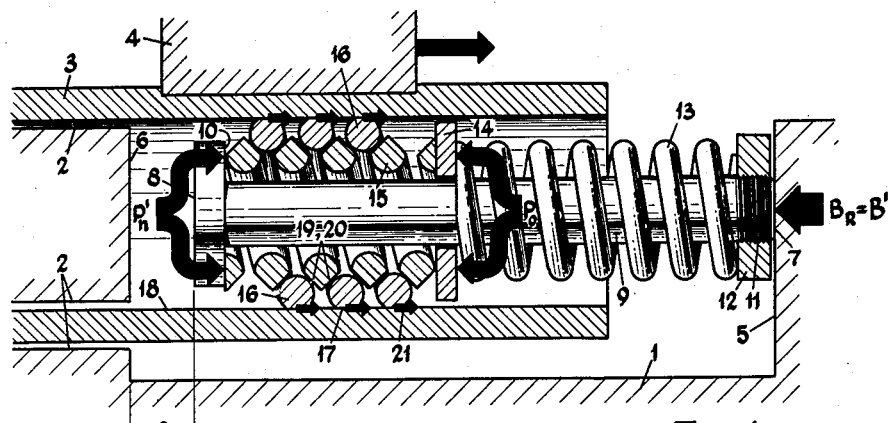
FIG. 1 is a longitudinal section showing the basic arrangement of the friction brake in position to exert braking forces on a mass moving in the direction of the arrow.

As shown in FIG. 1, one form of the friction brake of this invention is mounted in a stationary member 1 containing a guide track 2 for an axially displaceable cylindrical housing 3, which in turn is connected to a mass 4 being acted upon by exterior forces. The member 1 is provided with perpendicular surfaces 5 and 6 to serve as stops for the end surfaces 7 and 8 of a brake assembly, which is arranged concentrically within the housing 3 and which is axially displaceable over the distances between said stops 5 and 6. The brake retainer 9 of the brake assembly carries on its left end an outer flange 10 and on its right end a thread 11 for reception of a flange nut 12. Between the flange nut 12 and the left end flange 10, an actuator coil spring 13, a separator disc 14, and a friction unit consisting of a pair of nested coil springs 15, 16 are arranged in axial series and also concentrically to the brake retainer 9 and the surrounding housing 3. Due to the preload of the actuator spring 13, the ends of the inner spring 15 representing the brake seat are forced into contact with the separator disc 14 on the right and with the end flange 10 of the brake retainer 9 on the left. In other words, the actuator spring 13, the separator disc 14 serving as a first end support, the friction unit 15, 16 and the brake retainer 9 with its flanges 10 and 12 serving as a second end support, form a closed circuit of axial force transmission. The coils of the outer spring 16 representing the brake shoe do not contact either the end flange 10 or the separator disc 14, but have their outer surface 17 formed cylindrically for proper area contact with the inner surface 18 of the housing 3.

Figure 2:
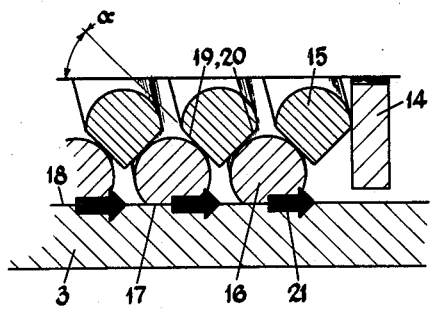
FIG. 2 is an enlarged portion of FIG. 1 showing the configuration of the inner and outer springs in the friction unit.

FIG. 2 is a close-up of a portion of FIG. 1 showing this configuration in greater detail. Here, the outer contact surface of the inner spring 15 is ground under an angle ($\alpha$) to the longitudinal axis of the assembly, with $\alpha$ being 45° in FIG. 1 and FIG. 2. The camming surfaces 19, 20 formed thereby are in contact with the adjacent coils of the outer spring 16. The dimensions of the two nested coil springs 15, 16 and the inner diameter of the housing 3 are such that neither the coils of the inner spring 15 nor those of the outer spring 16 can close, but are kept spaced apart by the confinement in the housing.

The actuator spring 13, due to its axial preload $P_0$, tends to compress the inner spring 15 representing the brake seat and thereby forces the coils of the outer spring 16 radially outward into pressure contact with the inner surface 18 of the housing. When the housing is now moved to the right, the brake assembly, due to the coupling effect of said radial contact forces, will follow with the housing until the brake retainer 9 by means of its end surface 7 is arrested at the stationary stop 5.

From now on, the housing 3, due to its kinetic energy, will slide with respect to the arrested brake assembly and generate axial friction forces 21 on the coils of the outer spring 16 due to said radial contact forces. During the braking operation, the preload $P_0$ of the actuator spring is transmitted from the separator 14 through the pair of nested springs 15, 16 to the flange 10 in zig-zag fashion, with the inner surface 18 of the housing 3 participating in the force transmission. With the housing moving to the right as shown in FIG. 1, the previously discussed case of opposing spring and brake forces is realized and the axial force $P_n'$ transmitted at the left end flange 10 is smaller than $P_0$. The friction forces 21 exerted on the brake shoe 16 then add up to a total brake force $B_R$ of the "low" level $B'$.

When the housing reverses its motion, the brake assembly is first carried to the left until the brake retainer 9, by means of its end surface 8, reaches the stationary stop 6, with no brake force developed while the housing is traversing the distance $s$. When the housing then slides with respect to the arrested brake assembly, the friction forces exerted on the outer spring 16 act now in the same direction as the spring force $P_0$ transmitted to the brake seat 15 through the separator disc 14. The axial force $P_n$ at the flange 10 is then greater than $P_0$, i.e., the direction of force multiplication in the friction unit has been reversed. Therefore, the total brake force $B_L$ exerted on the friction unit is now of the "high" level $B$.

Figure 3:
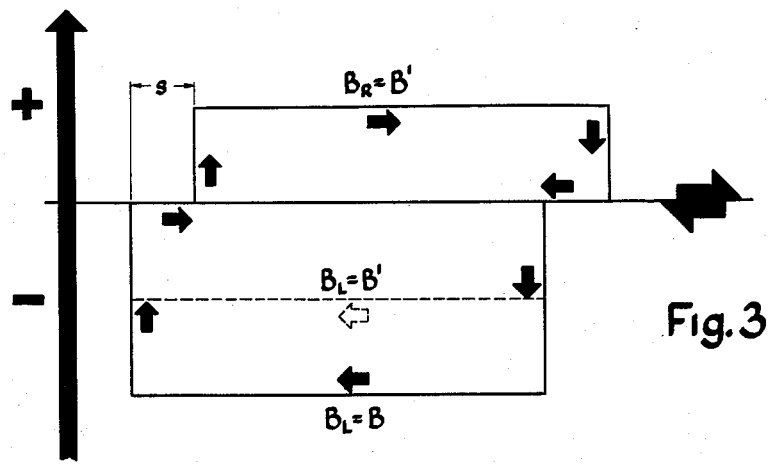
FIG. 3 is a force-displacement diagram showing the circuit cycle of the friction brake of FIG. 1.

The above discussed force cycle of the friction brake of FIG. 1 is further illustrated in the force-displacement diagram of FIG. 3 by means of a closed rectangle. The performance of the friction brake of FIG. 1 is clearly unsymmetrical with respect to the direction of motion, generating a "low" brake force $B_R = B'$ in the righthand direction and a larger brake force $B_L = B$ in the left-hand direction.

Figure 4:
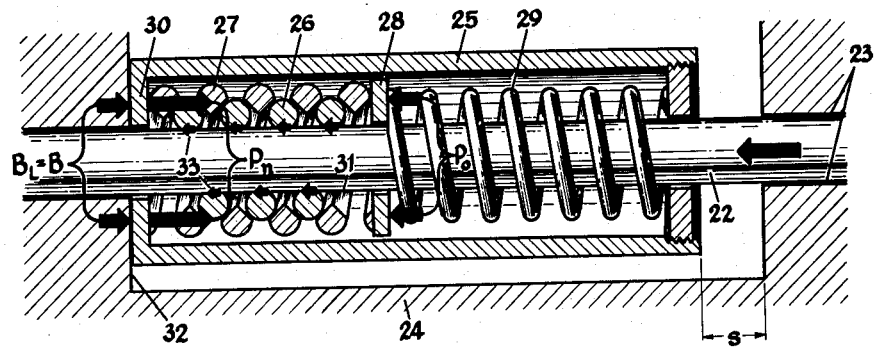
FIG. 4 is a sectional view similar to FIG. 1 but showing an arrangement where the movable member to be braked is in the form of a cylindrical rod passing through the inner spring of the friction brake.

FIG. 4 illustrates a reversed arrangement of friction brake as compared to FIG. 1. Here the member to be braked takes the form of a central rod 22 being guided in a bore 23 of the stationary member 24. The brake retainer 25 retains and also surrounds the series arrangement of a pair of nested springs 26, 27, a separator disc 28 and an actuator spring 29. Now it is the outer spring 27 which is in contact with the left flange 30 of the brake retainer 25 and the separator 28 on the right to serve as brake seat. The inner spring 26 is in frictional contact with the surface 31 of rod 22 and represents the brake shoe. In FIG. 4, the rod 22 is assumed to travel in the left-hand direction and has carried the brake retainer 25 into contact with the left-hand stop 32 of the stationary member 24. The brake forces 33 exerted on the brake shoe coils 26 now act in the same direction as the spring force $P_0$ on the separator side of the brake seat 27, which results in a total brake force $B_L = B$ of the "larger" amount.

Figure 5:
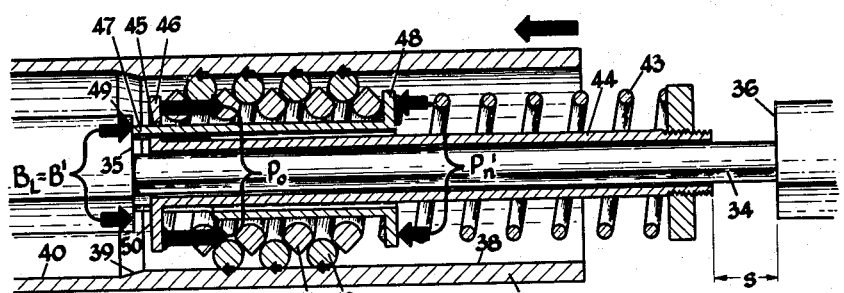
FIG. 5 is a longitudinal section showing a friction brake where the separator between the friction unit and the actuator spring is axially extended to contact the fixed stop on the stationary member when the housing is moving in the direction of the arrow.

FIG. 5 combines a number of other modifications of the basic design arrangement of FIG. 1:

First, the stationary member takes the form of a central rod 34, with radial steps 35 and 36 serving as stops for the brake assembly.

Second, the inner contour of the housing 37 changes from a cylindrical surface 38 confining the friction unit under radial contact forces to a widening tapered section 39 and then to an adjacent cylindrical section 40 of an inner diameter larger than the diametrical expansion range of the friction unit. When the tapered section 39 of the housing passes over the friction unit 41, 42, the coils of the brake seat 41 and brake shoe 42 are permitted to close under the axial force of the actuator spring 43, and the outer surface of brake shoe 42 then loses its contact with the inner surface of the housing. This reduces and finally eliminates the brake force over a certain travel range of the housing.

Third, the brake retainer 44 contains axial perforations 45 in its left flange 46 to receive extension prongs 47 of the separator 48. The left end surface 49 of the prongs 47 protrudes beyond the left end surface 50 of the retainer 44 to first contact the stop 35 when the housing 37 moves to the left. The left end surface 50 of the brake retainer cannot contact the stop 35, in contrast to FIG. 1 and FIG. 4.

FIG. 5 also illustrates the reversal in force transmission as compared to FIG. 1 and FIG. 4. With prongs 47 of the separator 48 contacting the left stop 35, the actuator spring 43 now exerts its force $P_0$ on the friction unit 41, 42 via the left retainer flange 46 and the case of opposing spring and brake forces is again realized. When changing from left-going to right-going motion in FIG. 5, the separator and the brake retainer exchange their roles as contact members on the stops 35 and 36, thus maintaining the direction of force multiplication in the friction unit 41, 42.

From this, a more general conclusion can be drawn: If the contact at the two stationary stops is made by one and the same end support, either the brake retainer or the separator, the direction of force multiplication in the friction unit changes with the direction of motion and the brake forces in the two directions will be unequal, "high" and "low." However, if the first end support contacts one stop and the second end support contacts the other stop, the direction of force multiplication in the friction unit and thereby the brake force, is the same for both directions of motion, either "high" or "low." In other words, in order to produce equal brake forces in both directions of motion, the closed force circuit of the brake assembly must be arrested at opposite end supports. In the particular arrangement of FIG. 5, the friction brake generates equal and "low" brake forces $B_L = B_R = B'$ in both directions. This symmetrical behavior is further illustrated in the force-displacement diagram of FIG. 3 by means of a dotted line.

Figure 6:
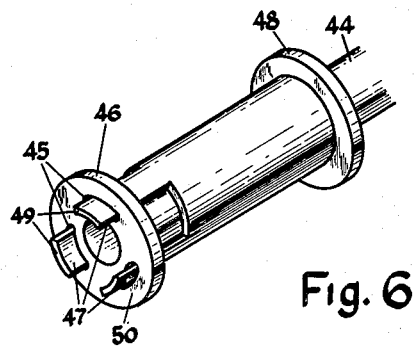
FIG. 6 is a perspective view of the combined separator and spring retainer used in the design of FIG. 5.

FIG. 6 gives a perspective view of the interacting brake retainer 44 and separator 48 of FIG. 5, showing three perforations 45 and three protruding extension prongs 47.

FIGURES 1, 4 and 5 show arrangements of friction brake, where the actuator spring is arranged in line with the friction unit. If only a short length is allowed, the actuator spring can also be arranged inside of the friction unit in telescopic fashion, by proper modification of the brake retainer and separator part. Besides the compactness of design, this version has also the advantage of a very large friction surface.

Figure 7:
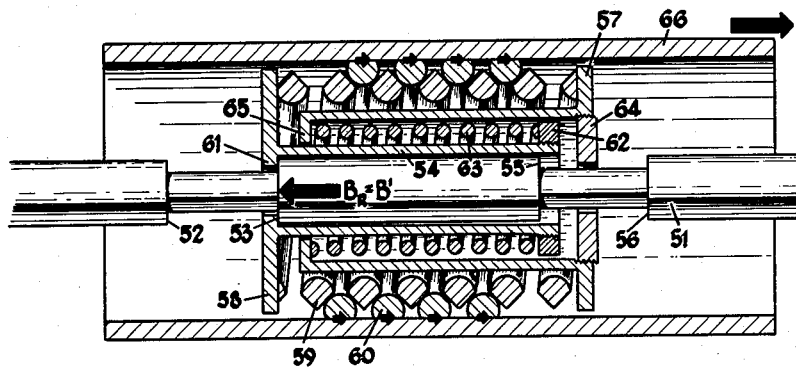
FIG. 7 is a longitudinal section showing a friction brake where the actuator spring is concentrically surrounded by the friction brake to reduce the axial length of the completed assembly.

FIG. 7 shows such a telescopic arrangement of brake assembly, with a compression spring serving as actuator spring. Here the stationary member 51 takes the form of a central rod with a pair of radial steps 52 and 53 serving as possible stops for the first end support 54 and another pair of radial steps 55 and 56 serving as possible stops for the second end support 57. The first end support 54 is a flanged tubular member with a left-hand outer flange 58 supporting the friction unit 59, 60, an inner flange or lug 61 for contacting the stop surface 52 and/or 53 of the member 51, and a right-end flange nut 62 for support of the actuator spring 63. The second end support 57 is shaped in a similar manner with a right-hand outer flange for support of the friction unit, a right inner flange nut 64 to be arrested by stop surfaces 55 or 56, and an inner left end flange 65 for support of the actuator spring 63. The precompressed actuator spring 63 tends to pull the two end supports 54 and 57 toward each other thus applying an axial compression force on the brake seat 59 of the friction unit. The brake shoe 60 is again in contact with the inner surface of the housing 66.

In FIG. 7, the right-going housing 66 has brought the first end support 54 to a halt by contact between inner flange 61 and stop 53. This represents the case of opposing spring and brake forces, where a "low" friction force $B_R = B'$ is generated. When the housing reverses its motion, it is now the second end support 57, which by means of its inner flange nut 64 is finally arrested at the stop 55 to again generate a "low" friction force $B_L = B'$.

It is evident from FIG. 7 that any combination of "high" and "low" brake forces can be obtained for the two directions by proper positioning of the stops 52, 53, 55 and 56 on the stationary member 51. For example, equal brake forces $B_L = B_R$ of the "high" amount B can be obtained by arresting the first end support 54 with a left-going housing 66 at the left stop 52 and the second end support 57 with a right-going housing at the right stop 56. If either end support is arrested in both directions, the brake will generate unsymmetrical brake forces of "high" and "low" amounts. It is further evident that this versatility in design is only made possible by installing at each of the two joints between opposite ends of the force generating means and the brake seat of the friction unit special end support members. These two end supports take their part in the closed force circuit of the brake assembly and can be used at will to contact the stops on the stationary member, to either maintain or reverse the direction of the force multiplication in the friction unit when the housing reverses its motion.

Figure 8:
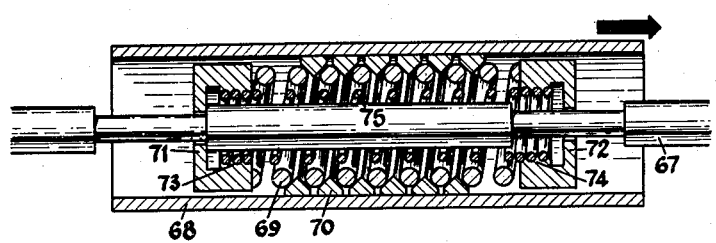
FIG. 8 is a longitudinal section of a friction brake where the actuator spring is held in extension between the same retainer members used to seat the friction unit.

In place of a compression spring, a conventional extension spring with originally closed coils can also be used as an actuator spring. The extension spring, due to its closing tendency, lends itself especially well to a telescopic design, as illustrated in FIG. 8. Here the stationary rod 67 is similar to that of FIG. 7, containing four (4) possible stop surfaces. An outer housing 68 contains a brake assembly comprising an inner brake seat 69 and an outer brake shoe 70. In contact with the left and right ends of the brake seat 69, there are two cylindrical support members 71 and 72 which by means of proper inner threads 73 and 74 are fastened to the ends of an extension spring 75 serving as actuator spring. In the assembled position, the extension spring 75 is stretched out and thus exerts axial compression forces on the ends of the brake seat 69. The actuator extension spring 75, the left end support 71, the brake seat 69 and the right end support 72 again form a closed force circuit. Of course, the fastening of the ends of the extension spring 75 to the end supports 71 and 72 can be accomplished in many different ways employing hooked ends, etc. In FIG. 8, the supports 71 and 72 are of identical shape resulting in a brake assembly of utmost symmetry. Likewise, the brake forces delivered can easily be made symmetrical by proper spacing of the stop surfaces. Contact at the two inner stops results in equal "low" forces while equal "high" forces are generated by contacting the two outer stops.

FIG. 9 illustrates still another simplification in design. Here the inner spring 76 of the friction unit 76, 77 is a conventional extension spring with originally closed coils, which is assembled to the outer spring 77 serving as brake shoe in a stretched-out position due to the confinement in the housing 78. The extension spring 76 then combines the functions of both the actuator spring and the brake seat to press the brake shoe 77 into contact with the housing 78. The ends of spring 77 may be properly modified or received in threaded supports 79 and 80 to serve as brake arrestors against the stops of the stationary member 81.

FIG. 10 shows still another simple version of friction brake with force generating brake seat. The extension spring 82 doubling as brake seat and force generating means has two conventional end hooks 83 and 84 which are engaged with some axial play $s$ in adjacent loops 85 and 86 of two stationary members 87 and 88. Due to the double function of extension spring 82 and the special shape and function of the spring ends serving as brake arrestors, there is no need for other end supporting members within the brake assembly. This version of friction brake generates equal brake forces of "low" level in both directions.

From FIG. 8 to FIG. 10 it becomes evident that the use of an extension spring as an actuator spring in a telescopic

What is claimed is:

1. A friction brake for arresting the travel of a reciprocating housing in either direction comprising a stationary member having fixed stops at opposite ends, an elongated spring retainer disposed in said housing for longitudinal movement between said fixed stops, an inner spring having a plurality of helical coils surrounding said retainer, an outer spring having a plurality of helical coils surrounding said inner spring coils in alternate nested arrangement, an actuator spring surrounding said retainer in adjacent longitudinal alignment with said inner spring, a separator surrounding said retainer between said inner and said actuator springs, a flange at each end of said retainer engageable with the corresponding ends of said inner and said actuator springs and positioned to continually urge said separator to compress said inner spring and expand said outer spring into frictional engagement with the interior wall surface of said housing whereby said retainer moves together with said housing until halted by contact with one of said fixed stops, so that the continued travel of said housing is finally arrested by said outer spring.

2. The combination defined in claim 1 where said end flanges on said retainer are disposed for alternate contact with said fixed stops whereby said actuator spring imparts a force to said inner spring opposite to the direction of motion of the housing during travel of said housing in one direction to decrease the total frictional forces between said housing and said outer spring while said actuator spring imparts a force to said inner spring in the direction of motion of the housing during travel of said housing in the opposite direction to increase the total frictional forces between said housing and said outer spring and reduce the distance in which the travel of said housing is arrested.

3. The combination defined in claim 1 where said separator is extended beyond the flange on one end of said retainer to contact said fixed stop in one direction of travel of said housing whereby said actuator spring imparts the same forces to said inner spring as those which are produced by the contact between said flange on the opposite end of said retainer and the other one of said fixed stops so that said outer spring imparts the same total frictional force to said housing on its travel in either direction, arresting it within the same distance.

4. The combination defined in claim 1 where a portion of said housing is increased in its interior diameter to limit the distance over which said outer spring serves to arrest the continued travel of said housing.

References Cited in the file of this patent

UNITED STATES PATENTS

| | | |
|---|---|---|
| 1,183,837 | Brooks | May 16, 1916 |
| 1,816,401 | Rolland | July 28, 1931 |
| 2,459,537 | Oberstadt | Jan. 18, 1949 |
| 2,705,633 | Potter et al. | Apr. 5, 1955 |
| 2,732,767 | Herlach | Jan. 31, 1956 |